United States Patent [19]

Borman

[11] 3,761,097

[45] Sept. 25, 1973

[54] TAPE CARTRIDGE POSITIONER

[75] Inventor: Maynard P. Borman, Falcon Heights, Minn.

[73] Assignee: Minnesota Mining and Manufacturing Co., St. Paul, Minn.

[22] Filed: Sept. 7, 1971

[21] Appl. No.: 178,463

Related U.S. Application Data

[63] Continuation of Ser. No. 843,695, July 22, 1969, abandoned.

[52] U.S. Cl.................. 274/4 C, 242/194, 242/198, 242/55.19 A, 274/11 C

[51] Int. Cl....... G11b 5/00, G03b 1/04, G11b 15/32

[58] Field of Search.................... 274/4 B, 4 C, 4 D, 274/4 E, 4 F, 4 G, 11 B, 11 C; 242/197–200, 55.19 A, 194; 352/74, 78 R

[56] References Cited

UNITED STATES PATENTS

| | | | |
|---|---|---|---|
| 3,570,780 | 3/1971 | Pastor | 242/194 |
| 3,043,531 | 7/1962 | Sinkewitsch | 242/198 |
| 3,263,936 | 8/1966 | Williams | 242/194 |
| 3,367,592 | 2/1968 | Smith | 242/200 |
| 3,173,623 | 3/1965 | Schoebel | 242/194 |
| 3,243,134 | 3/1966 | Reed | 242/55.19 A |
| 3,529,890 | 9/1970 | Buon | 352/78 R |

*Primary Examiner*—Leonard D. Christian
*Attorney*—Kinney, Alexander, Sell, Steldt & Delahunt

[57] ABSTRACT

A tape recording and/or reproducing machine in which tape extending across an opening in one face of a tape cartridge is positively aligned with a capstan and a transducer supported on the machine by pulling the cartridge to draw the cartridge face against abutments supported on the machine.

7 Claims, 4 Drawing Figures

INVENTOR.
MAYNARD P. BORMAN
BY Kinney, Alexander,
Sell, Steldt & DeLaHunt
ATTORNEYS

PATENTED SEP 25 1973 3,761,097

SHEET 2 OF 2

INVENTOR.
MAYNARD P. BORMAN
BY Kinney, Alexander,
Sell, Steldt & DeLaHunt
ATTORNEYS

TAPE CARTRIDGE POSITIONER

This is a continuation of application, Ser. No. 843,695 filed July 22, 1969 and now abandoned.

This invention relates to an improved tape recording and/or reproducing machine and in one aspect to a combination tape cartridge and tape recording and/or reproducing machine in which tape extending across an opening in one face of a tape cartridge is aligned with a capstan and a transducer on the machine by pulling the cartridge to draw the cartridge face against abutments supported on the machine.

In tape recording and/or reproducing machines utilizing a capstan drive and a transducer positioned adjacent the capstan it is necessary that the magnetic tape in each cartridge be aligned as accurately as possible with the capstan and the transducer of the machine to afford uniform movement of the tape past and aligned with the transducer. If the tape is not properly aligned with the capstan it may not be driven uniformly across its width and it may not be driven at a uniform speed and may be misaligned with the transducer resulting in nonuniform movement of the tape past the transducer and, consequently, a high degree of undesirable output commonly known as wow and flutter. Misalignment with the transducer may result in the failure to detect signals on the tape. This problem is especially severe in tape recording and/or reproducing machines utilizing tape cartridges since each cartridge and the machine must be made to cooperate to properly align the tape. Such cooperation in prior art devices has generally been achieved by making the cartridge of a relatively rigid material and to close manufacturing tolerances with the tape guide path through it precisely fixed. The machine is then provided with a cavity, the walls of which guide the cartridge as it is placed in position or pins and spindles which cooperate with apertures in the cartridge and with the reels in the cartridge to position the tape. However, since the cartridge shell is necessarily made in two halves to permit insertion of the tape spools and threading of the tape along its guide path, not only must the shell halves be precisely made but they must also be precisely mated so that the tape guide path is not distorted upon assembly of the halves. Especially with larger cartridges with journalled reels in the cartridge such precision is not only difficult and costly to achieve but also the plastics normally used for the cartridge shells are not sufficiently rigid to precisely fix the tape guide path.

In the present invention a tape recording and/or reproducing machine is provided in which a cartridge is formed with fixed pin means which may be pulled to draw a face of the cartridge against abutments which are located in the machine with precision relative to a capstan and a transducer and which engage the cartridge face at spaced points that are located quite precisely relative to the tape guide path to align tape guided across the face of the cartridge with the capstan and the transducer. A combination tape cartridge and tape recording and/or reproducing machine is provided in which spaced points on the cartridge face are engaged by abutments on the machine to align tape extending along the cartridge face with a capstan and a transducer. The alignment of the path is achieved with the cartridge in the machine, irrespective of the relationship of the guides of the cartridge when removed from the machine.

The novel features and advantages of the present invention will become apparent after reading the following description which refers to the accompanying drawing wherein.

Figure 1:
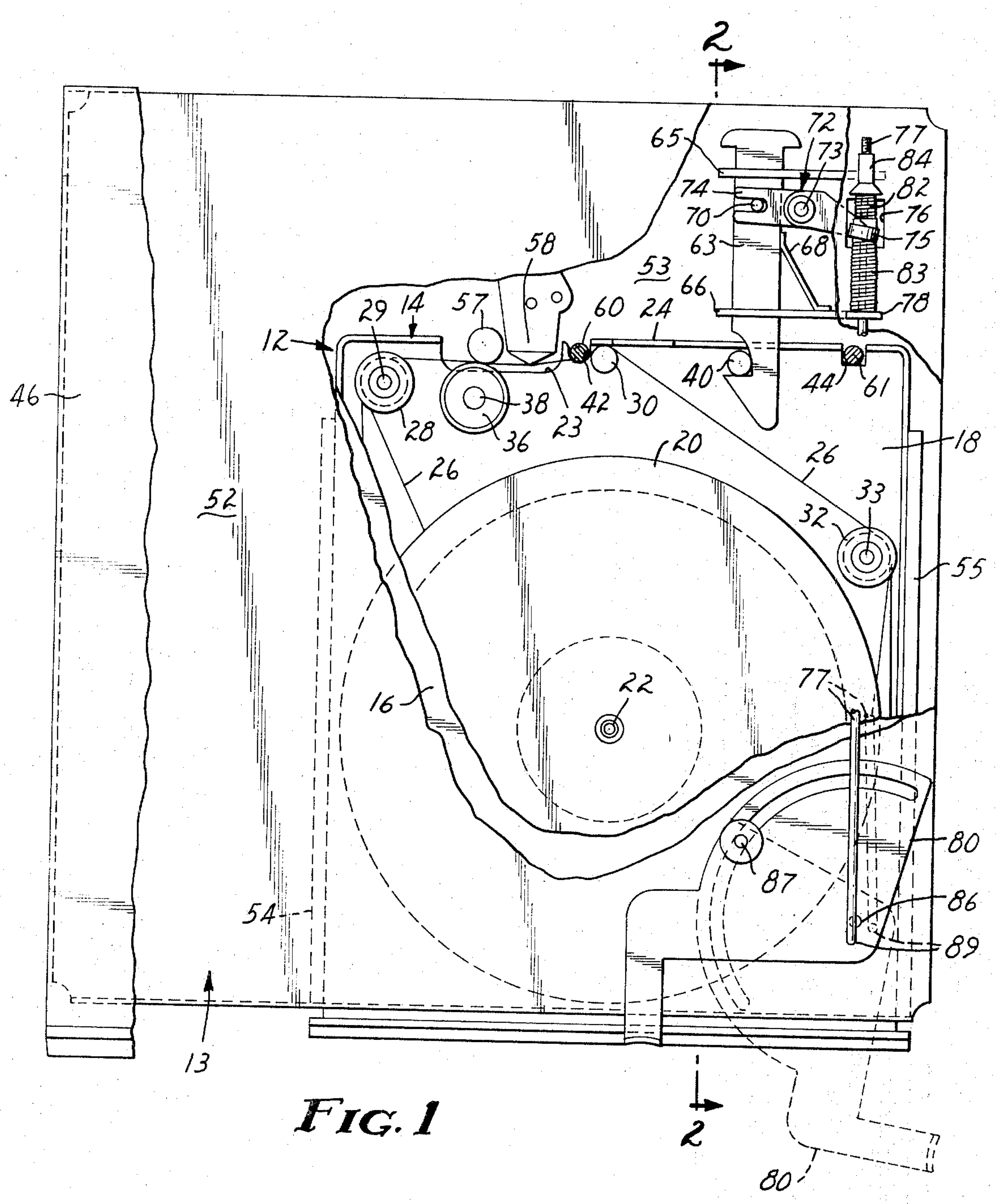
FIG. 1 is a planar view partially in section of a tape recording and/or reproducing machine and cooperating cartridge constructed in accordance with the present invention.
Figure 2:
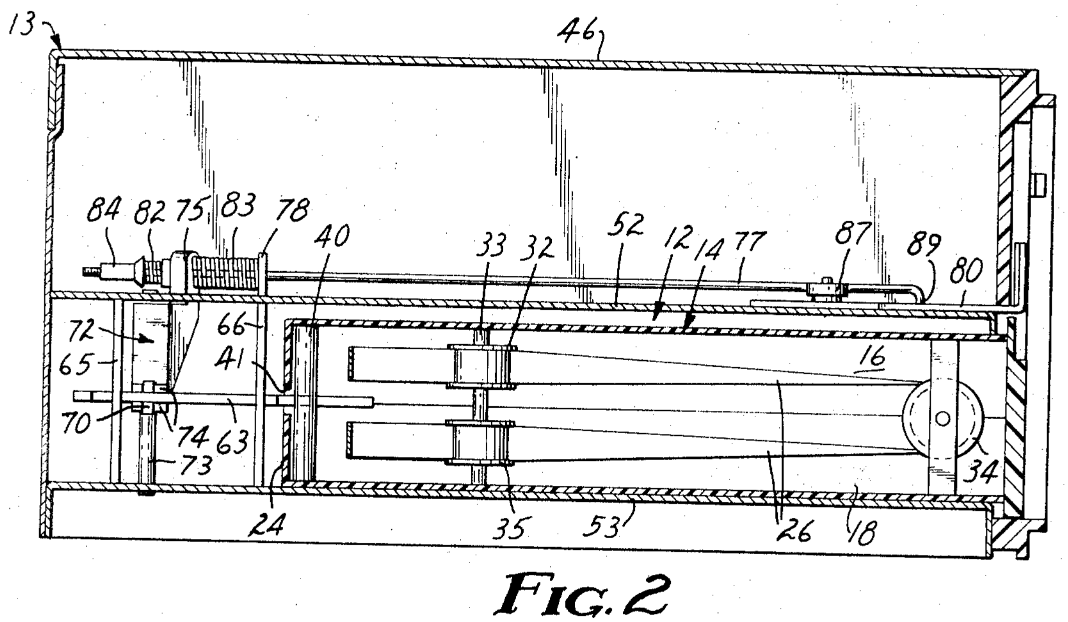
FIG. 2 is a longitudinal cross-sectional view taken along line 2—2 of FIG. 1.

Referring now to the Figures, there is illustrated a tape cartridge 12 and a recording and/or reproducing machine 13 made in accordance with the present invention.

The cartridge 12 comprises a box-like container 14 made from a molded polymeric material and comprising an upper shell 16 and a lower shell 18 adapted to be secured together by suitable fasteners. The shells 16 and 18 enclose a pair of similar reels 20 which are independently rotatably supported in axially aligned position generally centrally of the container 14. The support shaft 22 for the reels 20 is supported between the upper and lower shells 16 and 18.

The upper and lower shells 16 and 18 are formed with similar rectangular side and edge wall openings forming a rectangular recessed opening or cutaway portion 23 in one face 24 of the cartridge 12 to expose the tape in the tape path to be hereinafter described. A length of tape 26 is wound on each of the reels 20 in the same direction, i.e. the tape, as viewed in FIG. 1, is convolutely wound clockwise around the inner hub of each reel toward the periphery. Guide means are provided to define a tape path from one reel along the one face 24 of the container 14 across the cutaway portion 23 and back across the cutaway portion to the other reel. The tape path extends from the upper reel 20 around a first guide pulley 28 rotatably mounted on a support pin 29 positioned on one side of the cutaway portion 23, across the cutaway portion 23 of the container 14, around a stationary guide pin 30 positioned on the opposite side of the cutaway portion 23 from first pulley 28, around a second guide pulley 32 rotatably mounted on a support pin 33, and to a third guide pulley 34. Guide pulley support pins 29 and 33 and guide pin 30 are supported between the upper and lower shells 16 and 18 with their axes parallel to the axis of the reels 20 while third guide pulley 34 is journalled about an axis normal to the axis of the reels. The tape 26 in traversing the third guide pulley 34, is turned 180° and returns from the lower side of the pulley 34, around a fourth guide pulley 35 independently rotatably mounted on pin 33 below the second guide pulley 32, around the stationary guide pin 30 spaced below the first pass across that pin; around a fifth guide pulley (not shown) independently rotatably mounted on support pin 29 below first guide pulley 28, and onto the lower reel 20.

A pressure roller 36 is rotatably supported adjacent the cutaway portion 23 with its periphery in contact with the tape 26 between the first guide pulley 28 and the stationary tape guide pin 30. The shaft 38 supporting the pressure roller 36 is supported between the upper and lower shells 16 and 18 with its axis parallel to the axes of the first guide pulley support pin 29 and the stationary guide pin 30.

A cartridge locking pin 40 is supported at opposite ends in the cartridge shells adjacent the cartridge face 24 and generally parallel to the guide pulley support pins 29 and 33. Pin 40 is spaced from the cutaway portion 23 of the face 24. A narrow cartridge locking arm slot 41 is formed in the cartridge face 24 centrally of the width of the face and aligned with the locking pin 40 to provide access to the locking pin 40 by a locking arm 63 to be hereinafter described.

Openings connecting pairs of opposed small rectangular recesses 42 and 44 are formed in the cartridge face 24, one pair to each side of the locking pin 40, and, The recesses 42 or 44 of each pair are equidistant from the locking pin 40 and they are also equidistant from the points on their associated cartridge shells 16 and 18 supporting pins 29 and 33. The recesses 42 nearer the cutaway portion 23 are formed to lie between stationary tape guide pin 30 and the cutaway portion 23. In molding the upper and lower shells 16 and 18 the support points of the pulley support pins 29 and 33, the stationary guide pin 30, the pressure roller support shaft 38, and the reel support shaft 22 on each shell are precisely located relative to the recesses 42 and 44 on that shell and the distance between a like support point and a like recess 42 or 44 is made the same on both shells 16 and 18. Thus, when the cartridge is assembled with the tape extending along its guide path, the tape 26 extending across the opening or cutaway portion 23 in the cartridge face 24 will be precisely located with respect to the recesses 42 and 44 through the first guide pulley support pin 29, stationary guide pin 30 and second guide pulley support pin 33 which define a tape guide path. Since the reel support shaft 22 is also located with respect to the recesses 42 and 44 the portion of the tape path between the reels 20 and the first guide pulley support pin 29 is also precisely located with respect to these recesses 42 and 44 to further aid in properly aligning the tape across the cutaway portion 23. The recesses 42 and 44, therefore, provide four spaced reference points on the cartridge face 24 which are precisely located with respect to the tape guide path. Furthermore, the precise location of the supporting points for the pressure roller shaft 38 assures its parallelism with the stationary tape guide pin 30 and the first guide pulley 28 when the cartridge is locked in the machine thereby providing alignment of the pressure roller 36 with the tape extending across the cutaway portion 23.

The recording and/or reproducing machine 13 has a cabinet 46 formed with a rectangular opening 48 having generally the same dimensions as the cartridge face 24 in which the cutaway portion 23 is formed. The opening 48 provides access to a cartridge receiving cavity 50 formed by normally horizontal upper and lower support decks 52 and 53 and two vertical walls 54 and 55, one on either side of the opening 48. The vertical walls 54 and 55 generally guide the cartridge 12 as it is pushed through opening 48 along the lower support deck 53 until the cartridge is positioned as shown in FIG. 1.

A vertical capstan 57 is rotatably supported on the lower support deck 53 at the end of the cavity 50 and it is positioned to lie within the cutaway portion 23 of the cartridge 12 adjacent the pressure roller 36. It is rotatable by conventional means, not shown, to provide uniform rotation for driving the tape 26. A magnetic head 58 is supported on the lower deck 53 adjacent the capstan 57 to contact the tape 26 between the first guide pulley 28 and the stationary guide pin 30. The head 58 is positioned to be properly aligned with the tape 26 when the width of the tape lies flat against the periphery of the capstan.

Two cartridge positioning abutments of pins 60 and 61 are supported between the upper and lower support decks 52 and 53 with their axes parallel to each other and to the axis of the capstan 57. These pins 60 and 61 are positioned to engage the cartridge face 24 as the pressure roller 36 presses the tape 26 against the capstan 57. One of the positioning pins 60 is positioned to fit snugly in the cartridge face against a wall of the recesses 42 defining spaced reference points nearer the cutaway portion 23 and it is formed with smaller diameter portions in the two areas in which the tape path crosses it to further guide the tape 26. The other positioning pin 61 is positioned to fit within the cartridge recesses 44 against a wall of the recesses 44 defining spaced reference points near the edge of the face 24. Pin 61 has a diameter less than the width of the recesses 44.

The cartridge locking arm 63 is movably supported generally midway of the height of a pair of brackets 65 and 66 extending between support decks 52 and 53 to pass through the narrow locking arm slot 41 in the cartridge face 24. This arm has a curved end extending into the cartridge 12 and is formed with a hook along one edge which engages cartridge locking pin 40 in the space defined by four parallel lines each extending through one of the four reference points perpendicular to a plane through the axes of the cartridge positioning pins 60 and 61. It is biased by a leaf spring 68 toward locking pin 40 so that as the cartridge 12 is inserted into the cavity 50 the locking pin 40 first contacts the curved end of the locking arm 63. Further movement of the cartridge 12 then causes pin 40 to bias the locking arm 63, against the force of leaf spring 68, out of the way until the locking pin 40 passes the hook which is then moved into engagement with the locking pin 40 by the leaf spring 68. A pin 70 is secured to the arm 63 between its support brackets 65 and 66 and extends vertically through the arm.

A connecting linkage 72 is rotatably mounted on a shaft 73 that is supported between the upper and lower decks 52 and 53 adjacent the locking arm 63. The linkage is formed with a pair of arms 74 that extend to one side of the support shaft 73, which arms have bifurcated ends that engage the pin 70 on the locking arm 63, one above and one below the locking arm 63. To the other side of the support shaft 73 the linkage 72 is formed with a tab 75 that extends vertically through an opening 76 in the upper support deck 52. Above the upper deck the linkage tab 75 is formed with an aperture through which a linking rod 77 extends.

The linking rod 77 extends along the upper deck 52 above the cartridge cavity 50 through a bracket 78 and is secured at its end to a crank arm or cartridge locking lever 80 to form an over center toggle or locking member therewith. A pair of compression springs 82 and 83 are carried on the linking rod 77, one 83 between the linking rod bracket 78 and the connecting linkage tab 75 and the other 82 between the tab 75 and an adjusting nut 84 threaded on the free end of the linking rod 77. These springs 82 and 83 position the connecting linkage tab 75 along the linking rod 77 and provide a resilient link between the linking rod 77 and the connecting linkage 72. The cartridge locking lever 80 is supported above the upper deck 52 for rotation about its support pin 86. It is formed with an arm having an upturned end protruding from the cabinet 46 above the cartridge cavity opening 48 for manual rotation of the lever 80 about its support pin 86 from an unlocked position (illustrated in dotted lines in FIG. 1 and in full lines in FIG. 3) to a locked position (illustrated in full lines in FIG. 1). A guide pin 87 extends from the upper support deck 53 through a curved slot in the lever 80 to limit rotation of the lever. The position of the guide pin 87 and the length of the curved slot are such as to provide rotation of the pivot point of attachment defined by pin 89 between the locking lever 80 and the linking rod 77 partially around the lever support pin 86 to an over-center position as the lever 80 is rotated from its unlocked to its locked position and to retain it in this position against the force of compression springs 82 and 83. The point of attachment 89 between the locking lever 80 and the linking rod 77 is also adjusted to provide sufficient longitudinal movement of the locking arm 63 through the linking rod 77, the compression springs 82 and 83, and the connecting linkage 72 to draw the cartridge face recesses 42 and 44 firmly against the positioning pins 60 and 61 as the cartridge lever 80 is rotated to its locked position. Some adjustment of the force with which the locking arm 63 draws the cartridge face against the positioning pins is provided by the adjusting nut 84 at the end of the linking rod 77.

Figures 3, 4:
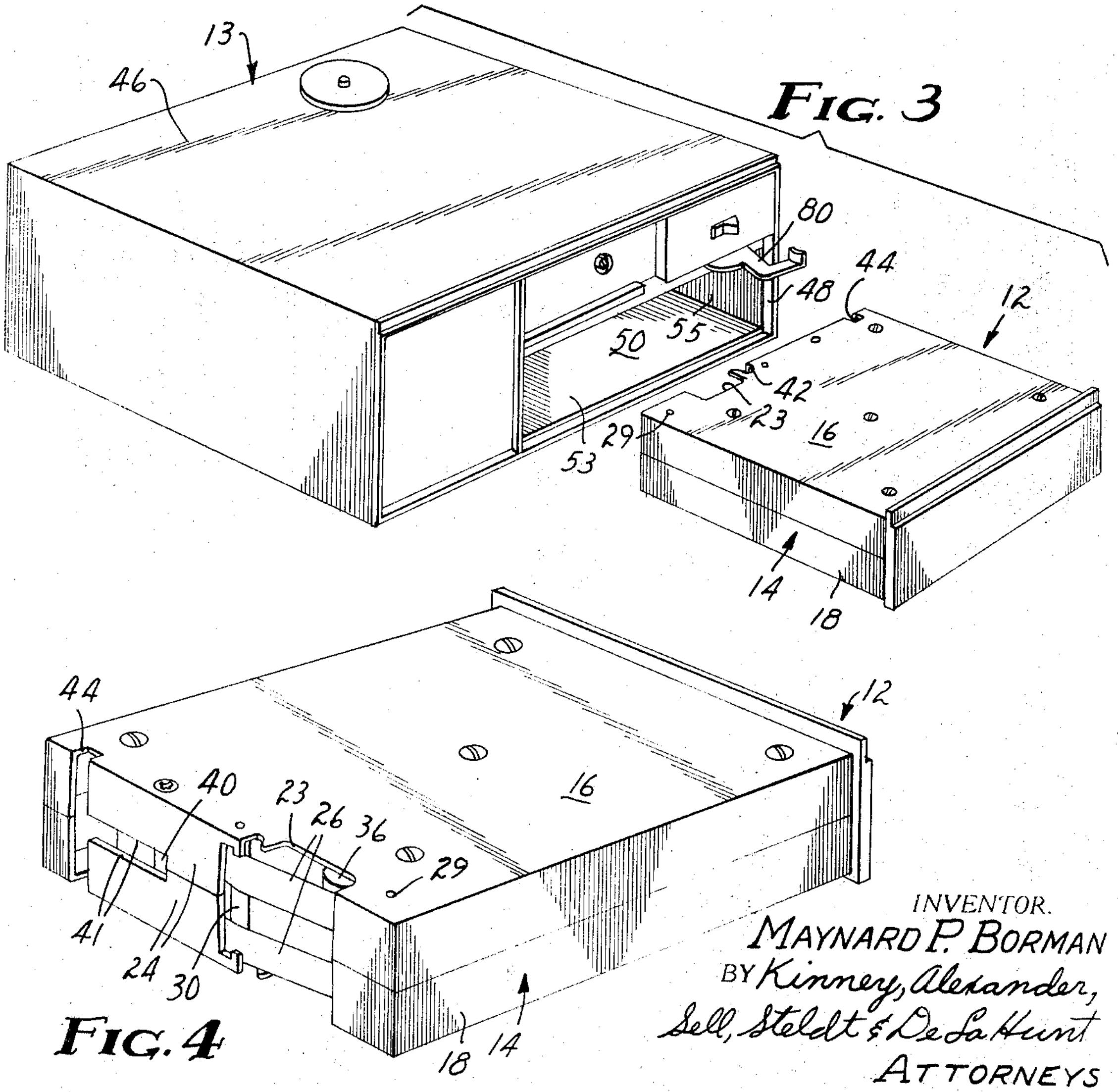
FIG. 3 is a perspective view illustrating a tape cartridge aligned with a cavity in a recording and/or reproducing machine made in accordance with the present invention.
FIG. 4 is a perspective view of a tape cartridge for use in the combination of the present invention.

In use, the cartridge locking lever 80 is rotated to its unlocked position (dotted line position in FIG. 1) by pulling its upturned end away from the cabinet 46. The cartridge 12 is then aligned with the cartridge receiving cavity 50 as illustrated in FIG. 3 and it is inserted into the cartridge receiving cavity 50 through the cartridge opening 48. The cartridge 12 is pushed along the lower support deck 53 until the cartridge locking pin 40 passes the hook in the cartridge arm 63 which is then moved into engagement with the locking pin 40 by the leaf spring 68. The cartridge locking lever 80 is then rotatated to its locked position (full line position in FIG. 1) by pusing its upturned end toward the cabinet 46. As the locking lever 80 is rotated the cartridge locking arm 63 is moved through the linking rod 77, the compression springs 82 and 83, and the connecting linkage 72 to pull against the cartridge locking pin 40. In pulling against the cartridge locking pin 40, the locking arm 63 draws the reference points or walls of recesses 42 and 44 in the cartridge face 24 snugly against the cartridge positioning pins 60 and 61. Since the positioning pins 60 and 61 are parallel to the capstan 57 and stationary and since the walls of the recesses 42 and 44 will each be pulled against one point on its corresponding positioning pin 60 or 61, the four reference points on the cartridge will be forced to lie on a common positioning plane which is parallel to the axis of capstan 57. Further, since these four reference points are precisely located relative to the support points of the first guide pulley support pin 29, stationary guide pin 30 and the pressure roller shaft 38 at equal distances from like support points on the two shells 16 and 18, the axis of the first pulley 28, the guide pin 29 and the pressure roller 36 will be parallel to the positioning plane. The tape guide path across the opening or cutaway portion 23 in the cartridge face 24 will, therefore, be parallel to the capstan 57 and the tape will contact the capstan across its width and extend normal to the axis of the capstan as desired. Thus, even if the cartridge shells 16 and 18 are not properly mated in assembly and even though the shell walls may be warped in molding the tape path will be aligned with the capstan 57 and the transducer or magnetic head 58.

To remove the cartridge 12 from the machine 13 the upturned end of the locking lever 80 is rotated away from the machine beyond the dotted line position illustrated in FIG. 1. This further rotation causes the locking arm 63 through its pin 70 to rotate with the connecting linkage 72 against the force of the leaf spring 68 until the hook of the locking arm 63 is out of the line of movement of the locking pin 40. When the locking arm 63 is so rotated the cartridge 12 may be grasped and withdrawn from the machine 13.

Having thus described the present invention with respect to one embodiment

What is claimed is:

1. A combination tape cartridge and tape recording and/or reproducing machine comprising:

a tape cartridge comprising:

an upper shell and a lower shell defining a box-like enclosure having spaced side walls and connecting edge walls with first and second openings in the face of one edge wall, said shells having their juncture along said edge walls, said face of said one edge wall being formed with means defining four spaced nonlinear reference points, two of said reference points being defined on each said shell, guide members supported by said side walls of said shells and positioned with respect to said reference points, said guide members defining a tape path within said enclosure along said face of said one edge wall and across said first opening, and pin means supported by said shells within said enclosure for engagement through said second opening by cartridge drawing means; and a tape recording and/or reproducing machine comprising:

means defining a cavity for receiving said cartridge, a capstan rotatably mounted adjacent said cavity for driving said tape along said tape path, a transducer supported adjacent said cavity for engaging said tape as it moves across said first opening in the face of said one cartridge edge wall, means defining abutments supported adjacent said cavity for engaging said spaced reference points defined at said face of said one cartridge edge wall, said abutments being positioned with respect to said capstan and said transducer to position said guide members defining said tape path when said abutments engage said spaced reference points for positioning said tape moving along said tape path in alignment with said capstan and said transducer, and cartridge drawing means movably supported adjacent said abutments for engaging said pin means through said second opening when said cartridge is inserted into said cavity, said cartridge drawing means being movable to pull on said pin means to draw said spaced reference points defined at said face of said one cartridge edge wall against said abutments to assure the alignment of said tape with said capstan and said transducer to afford uniform movement of said tape past said transducer.

2. The combination recited in claim 1 wherein said means defining abutments comprises a pair of generally cylindrical registering members supported with their axes parallel to each other and to the axis of said capstan.

3. The combination recited in claim 2 wherein said cartridge drawing means comprises a retractable and extendable arm means formed and supported for movement to engage said pin means and to pull on said pin means to draw said reference points on said one cartridge face against said registering members.

4. The combination recited in claim 3 wherein said arm means extends between said registering members to engage said pin means.

5. The combination recited in claim 4 wherein said arm means is movable perpendicular to a plane containing the axes of said registering members to draw said one cartridge face against said registering members.

6. The combination recited in claim 5 wherein said means defining said spaced reference points define recesses in said one cartridge face to receive said registering members to aid in aligning said cartridge.

7. The combination recited in claim 1 wherein said abutments are positioned to engage said cartridge face at four coplanar points to define an aligning plane and said cartridge drawing means engages said pin means within the space defined by four parallel lines each extending through one of said four points perpendicular to said aligning plane.

* * * * *